United States Patent
Hoshino et al.

(10) Patent No.: US 6,976,470 B2
(45) Date of Patent: Dec. 20, 2005

(54) DEVICE FOR CONTROLLING THROTTLE VALVE

(75) Inventors: Masatoshi Hoshino, Tsuchiura (JP); Minoru Oosuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/485,993

(22) PCT Filed: Aug. 8, 2001

(86) PCT No.: PCT/JP01/06811

§ 371 (c)(1),
(2), (4) Date: Mar. 30, 2004

(87) PCT Pub. No.: WO03/014554

PCT Pub. Date: Feb. 20, 2003

(65) Prior Publication Data

US 2004/0244771 A1    Dec. 9, 2004

(51) Int. Cl.$^7$ ............................ F02D 9/02; F02D 41/14

(52) U.S. Cl. ....................... 123/399; 123/361

(58) Field of Search ................... 123/361, 396, 123/399

(56) References Cited

U.S. PATENT DOCUMENTS

| | | | | |
|---|---|---|---|---|
| 4,418,673 A | * | 12/1983 | Tominari et al. | 123/399 |
| 4,524,745 A | * | 6/1985 | Tominari et al. | 123/399 |
| 5,080,064 A | * | 1/1992 | Buslepp et al. | 123/399 |
| 5,092,420 A | * | 3/1992 | Sugawara et al. | 123/399 |
| 5,640,943 A | * | 6/1997 | Tasaka et al. | 123/399 |
| 5,964,200 A | * | 10/1999 | Shimada et al. | 123/399 |
| 6,055,960 A | * | 5/2000 | Marumoto et al. | 123/399 |

FOREIGN PATENT DOCUMENTS

| | | |
|---|---|---|
| JP | 2000-130229 A | 5/2000 |
| JP | 2001-82182 A | 3/2001 |
| JP | 2001-164975 A | 6/2001 |

* cited by examiner

*Primary Examiner*—Tony M. Argenbright
(74) *Attorney, Agent, or Firm*—Crowell & Moring LLP

(57) ABSTRACT

A control device for a throttle valve, by dispensing a position sensor for the throttle valve, can reduce a cost of the sensor and which is excellent in durability and reliability and is reduced in its control delay. The control device includes an air flow sensor 1 for detecting an air flow rate flowing through a intake pipe of an internal combustion engine, a motor 33 for driving the throttle valve 2 disposed in the intake pipe and an ECU 15 for controlling the driving operation of the motor. The ECU 100 feedback-controls the output of the air flow sensor so that a difference between the output of the air flow sensor 1 and an air flow rate required for the engine reduces.

3 Claims, 9 Drawing Sheets

DEVICE FOR CONTROLLING THROTTLE VALVE

TECHNICAL FIELD

The present invention relates to a device for controlling a throttle valve for electronically controlling the throttle valve and, in particular, relates to a control device for a throttle valve which can preferably control a flow rate of air sucked into an internal combustion engine without using a position sensor.

BACKGROUND ART

Conventionally, in general, a throttle valve for controlling a flow rate of air sucked into an internal combustion engine is interconnected to an acceleration pedal through a wire so that a driver controls the opening and closing of the throttle valve by operating the acceleration pedal. In contrast, in recent years, an electronic control throttle device has been spread in which positions of an acceleration pedal and a throttle valve as well as an operating state are detected, then a target position of the throttle valve is obtained by a microcomputer, and the throttle valve is controlled by a motor so as to trace the target position. The entirety of an air intake system can be simplified and reduced in cost by combining the electronic control throttle device with an idle control valve and an automatic cruise control device. In a direct fuel injection engine aiming the reduction of a fuel cost, since a relation between an engine torque desired by a driver indicated by an acceleration pedal position and an amount of air required for the desired engine torque changes largely depending on an operation state, it is difficult to mechanically link the acceleration pedal with a throttle valve.

Since the position control of the electronic control throttle device is performed so that the position of the throttle valve coincides with a target position, the reliability of a throttle position sensor is very important. In general, a potentiometer attached to the rotation shaft of the throttle valve is used in order to measure the position of the throttle valve. The potentiometer is a sensor which is arranged in a manner that a brush fixed to the rotation shaft contacts with a resistor disposed concentrically along the rotation direction of the shaft to divide a voltage at the contact point, whereby the divided voltage indicates the contact position. Another device for detecting the position of a throttle valve is also known in which a non-contact type sensor using hall-effect is provided at the throttle valve position detection unit in place of the potentiometer in order to improve the durability of the detection unit.

DISCLOSURE OF THE INVENTION

However, the potentiometer of the contact-type has a problem that the durability and reliability thereof is degraded since the brush or the contact surface of the resistor is worn away or foreign material is deposited on the resistor as being used and hence the output value of the sensor changes. Thus, at present, the reliability is secured by employing such a complicated fail-safe software that each of the resistor and the brush is provided in a duplex or triplex manner and the output of the sensor is compared. However, in this case, the cost of a sensor itself is almost as high as a motor. In other words, the potentiometer of the contact-type has problems of the cost as well as the durability and reliability. Further, since a memory capacity and an execution speed of the fail-safe software relating to the position sensor are several times or more as large as those of a controller main body, and so there arises a problem that a range of microcomputers capable of being used is limited.

In contrast, in the case of the non-contact type sensor using hall effect, the durability can be improved since there is no contact point at the sensor. However, the non-contact type sensor has a cost problem that a hall IC for calculating the position based on the output is required in addition to the hall element of the detection unit and further at least two sets are required in use in a view point of the reliability. Further, although the hall IC is arranged to digitize the output of the hall element and obtain the position by using a signal processing method, this calculation time causes the delay of the sensor. In the case of feedback-controlling the position of the throttle valve in the electronic control throttle device, as compared with the contact-type potentiometer which has little delay, the non-contact type sensor using hall effect has a problem that hunting likely occurs due to the delay of the detected phase of the throttle valve.

Accordingly, an object of the present invention is to provide a control device for a throttle valve which, by dispensing a position sensor for the throttle valve, can reduce a cost of the sensor and which is excellent in durability and reliability and is reduced in its control delay.

In order to attain the aforesaid object, the present invention is arranged in a manner that in a control device for a throttle valve which includes, an air flow sensor for detecting a flow rate of air flowing through a intake pipe of an internal combustion engine, a motor for driving the throttle valve disposed in the intake pipe, and control means for controlling driving operation of the motor, wherein the throttle valve is controlled so that a flow rate of air passing through the throttle valve coincides with an air flow rate required for the engine, the control device for a throttle valve is arranged in that the control means feedback-controls an output of the air flow sensor so that a difference between the output of the air flow sensor and the air flow rate required for the engine reduces.

According to such a configuration, since a position sensor for the throttle valve is dispensed, a cost of the sensor can be reduced, durability and reliability can be made excellent and control delay can be reduced.

BEST MODE FOR CARRYING OUT THE INVENTION

The configuration and operation of a control device for a throttle valve according to an embodiment of the present invention will be explained with reference to FIGS. 1 to 10.

First, the explanation will be made with reference to FIG. 1 as to the system configuration of a direct fuel injection engine using the control device for a throttle valve according to the embodiment.

Figure 1:
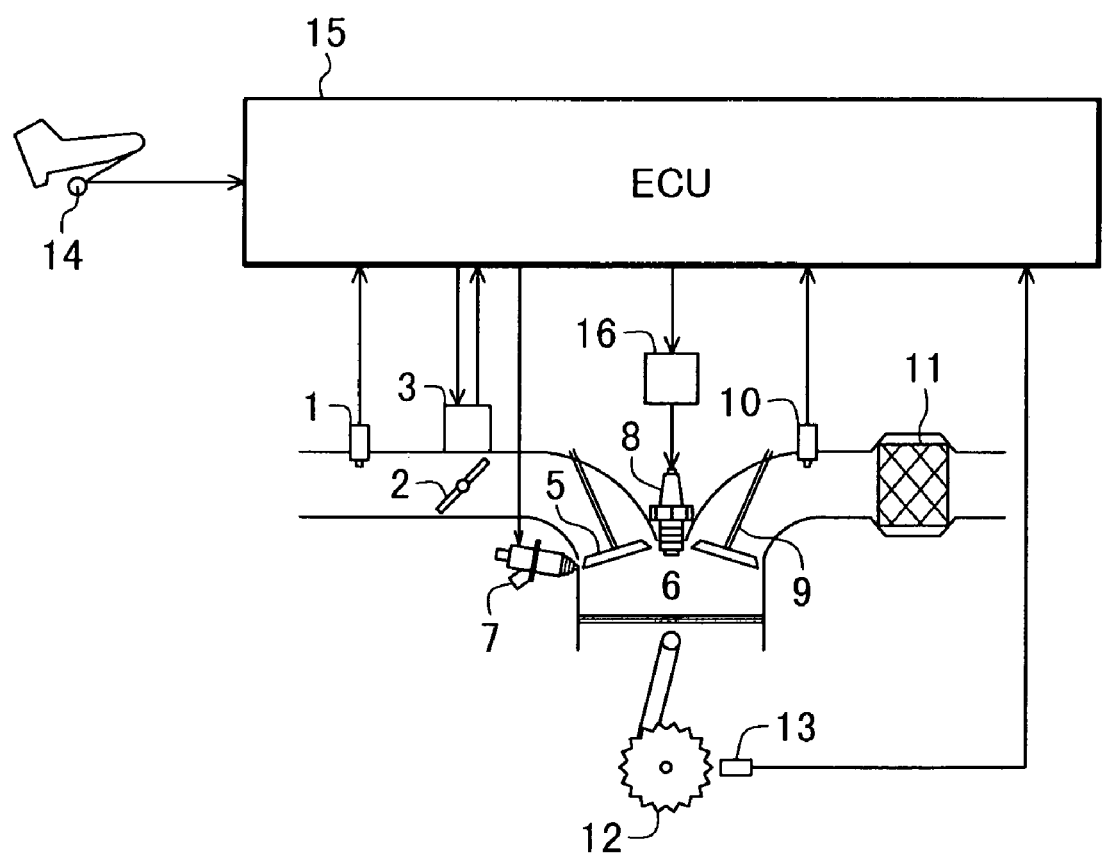
FIG. 1 is a diagram showing system configuration of a direct fuel injection engine using a control device for a throttle valve according to an embodiment of the present invention.

FIG. 1 shows the system configuration of the direct fuel injection engine using the control device for a throttle valve according to the embodiment.

The intake system of the internal combustion engine is provided with an air flow sensor 1 for detecting a flow rate of intake air, a throttle valve 2 for adjusting a flow rate of intake air and intake valves 5. The opening degree of the throttle valve 2 is controlled by a throttle valve driving means 3. The throttle valve driving means 3 detects a motor current flowing through a motor for driving the throttle valve 2 and outputs the detected value. Each of the combustion chambers 6 of the engine is provided with a fuel injection valve 7 for directly injecting fuel within a cylinder and an ignition plug 8. The ignition plugs 8 are driven by an ignition device control circuit 16 to ignite fuel spray within the combustion chambers 6.

The exhaust system of the internal combustion engine is provided with exhaust valves 9, an air-fuel ratio sensor 10 and catalyst 11. The exhaust system is further provided with a ring gear 12 attached to the crank shaft of the engine, a crank angle sensor 13 for detecting protruding portions of the ring gear to measure a rotation speed of the engine, and an acceleration pedal position sensor 14 for detecting a depression amount of the acceleration pedal.

This embodiment is characterized in that a throttle position sensor for detecting the position (opening degree) of the throttle valve, which has been used conventionally, is not employed.

An electronic control unit (ECU) 15 receives detection values such as a intake air flow rate detected by the air flow sensor 1, a depression amount of the acceleration pedal detected by the acceleration pedal position sensor 14, and a rotation speed and a crank angle etc. of the engine detected by the crank angle sensor 13. The ECU 15 calculates fuel amounts and timings for supplying the fuel to the engine based on the received signals and outputs driving pulses thereby to control the fuel injection valves 7 and drives the throttle valve 2 through the throttle valve driving means 3 so that the position (opening degree) of the throttle valve 2 exhibits a suitable value. The ECU 15 also calculates ignition timings to output an ignition signal to the ignition device control circuit 16.

Fuel is sent with pressure by a fuel pump from a not-shown fuel tank to the fuel injection valves 7 so that a predetermined amount of fuel is injected into the intake pipe at a predetermined timing in response to the driving pulse outputted from the ECU 15.

Intake air adjusted by the throttle valve 2 flows into the chamber 6 through the intake valve 5. Mixture of fuel and air is ignited by the ignition plug 8 and burnt. Exhaust gas after combustion is exhausted from the engine through the exhaust valve 9 and flows into the catalyst 11, whereat harmful components within the exhaust gas is purified. The catalyst 11 is formed by a catalyst which has both a so-called three-way catalyst performance for securing exhaust gas purifying performance in a stoichiometric air-fuel ratio operation and an HC adsorption performance for preventing degradation of exhaust gas in a warm-up operation. Alternatively, the catalyst may be formed by two catalysts having the three-way catalyst performance and the HC adsorption performance, respectively.

The air-fuel ratio sensor 10 outputs a signal according to an oxygen density of the exhaust gas after combustion. An air fuel ratio of the air-fuel mixture to be supplied is feedback-controlled so as to be a target air-fuel ratio based on an actual air-fuel ratio detected by the air-fuel ratio sensor 10. For example, when the air-fuel ratio sensor 10 is a type which outputs a binary value around the stoichiometric value, the feedback control of the air fuel ratio is performed only at the stoichiometric air-fuel ratio operation.

A not-shown passage and an EGR valve are provided at a path between the exhaust system and the intake system, which act to conduct a part of the exhaust gas again to the intake system thereby to reduce a combustion temperature to suppress the generation of NOx.

Next, explanation will be made with reference FIG. 2 as to the system configuration of the ECU used in the throttle valve controlling device according to the embodiment.

Figure 2:
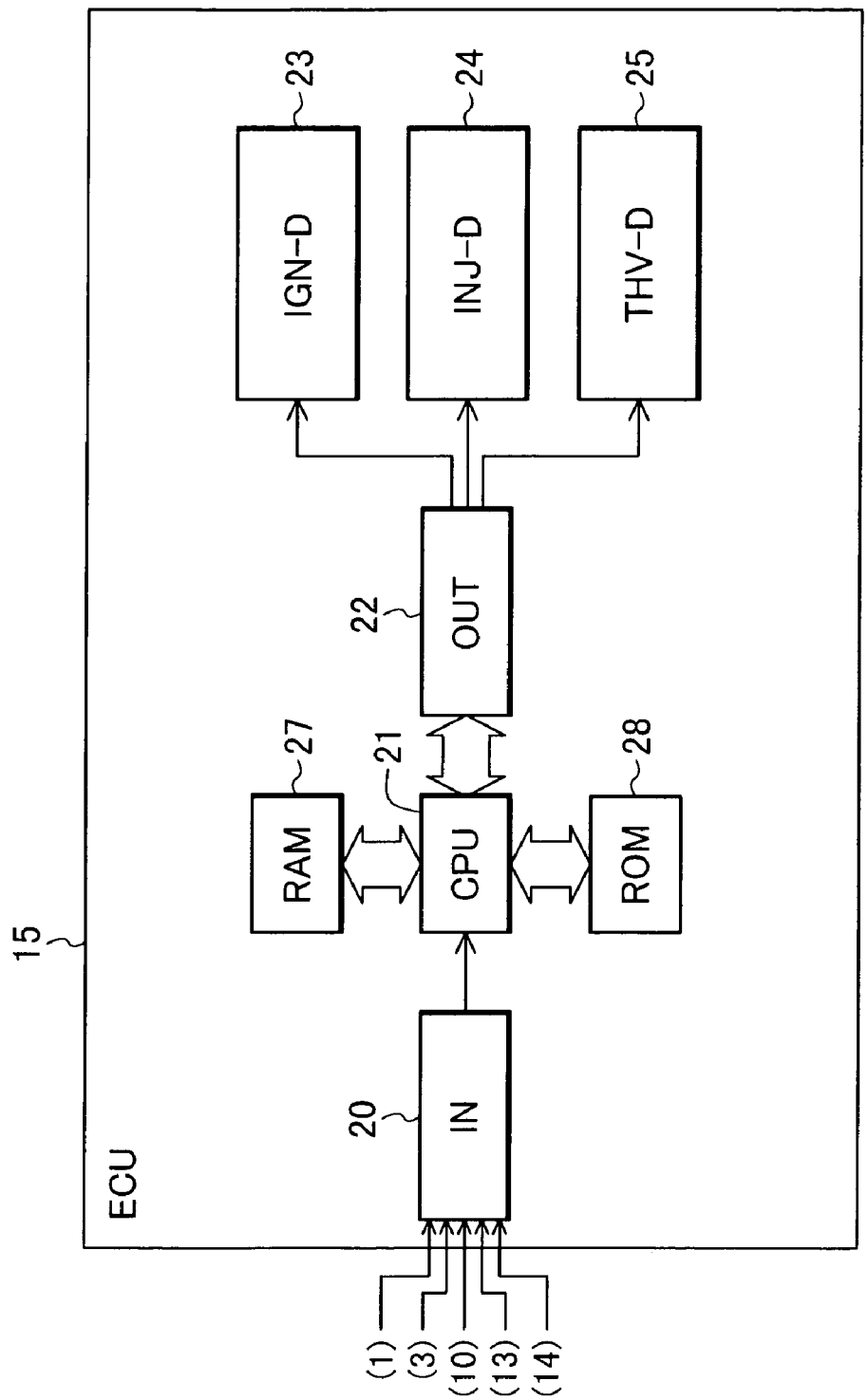
FIG. 2 is a diagram showing system configuration of an ECU used in the throttle valve controlling device according to the embodiment of the present invention.

FIG. 2 shows the system configuration of the ECU used in the throttle valve controlling device according to the embodiment of the present invention.

The ECU 15 is provided with an input circuit (IN) 20, a CPU 21, an output circuit (OUT) 22, an ignition device driving circuit (IGN-D) 23, an injector driving circuit (INJ-D) 24, a throttle valve driving circuit (THV-D) 25, a RAM 27 and a ROM 28.

The ECU 15 receives signals from the air flow sensor 1, the throttle valve driving means 3, the air-fuel ratio sensor 10, the crank angle sensor 13 and the acceleration pedal position sensor 14 shown in FIG. 1. The ECU 15 reads these input signals from the input circuit 20 and the CPU 21 performs a calculation processing based on program an constants stored in the ROM 28. As a result of the calculation processing, instructions of ignition timings, pulse widths and timings of the injector driving pulses and throttle valve opening degrees are outputted to the ignition device driving circuit 23, the fuel injection valve driving circuit 24 and the throttle valve driving circuit 25 through the output circuit 22 to perform the controls of the ignition, the fuel injection and the throttle valves, respectively. The RAM 27 is used for storing values of the input signals, the calculation results or the like.

Next, explanation will be made with reference FIG. 3 as to the system configuration of the throttle valve controlling device according to the embodiment.

Figure 3:
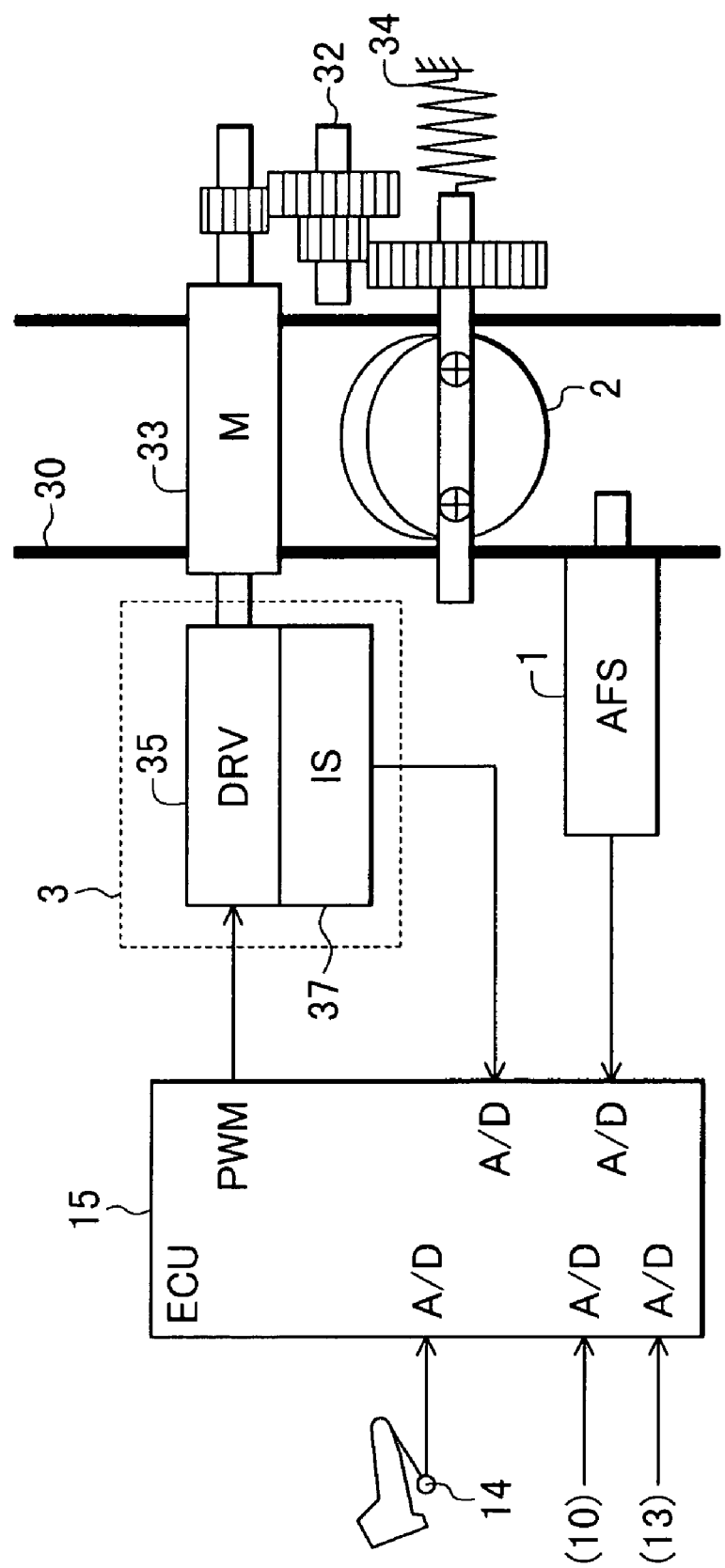
FIG. 3 is a diagram showing system configuration of the control device for a throttle valve according to the embodiment of the present invention.

FIG. 3 shows the system configuration of the throttle valve controlling device according to the embodiment of the present invention. In the figure, portions identical to those of FIG. 1 are referred to by the common symbols.

The motor driving means 3 is configured by a motor driving circuit (DRV) 35 and a motor current sensor (IS) 37. The motor driving circuit 35 supplies a current according to a duty ratio of a PWM signal supplied from the ECU 15 to a DC motor (M) 33 to drive the DC motor 33. The motor current sensor 37 detects a current flowing into the DC motor 33, and a motor current value thus detected is fetched into the ECU 15 through an A/D converter.

The throttle valve 2 provided at a intake pipe 30 is driven by the DC motor 33 through a deceleration gear 32. The throttle valve 2 is a butterfly valve. A spring 34 attached to the rotation shaft of the throttle valve 2 is set to restore the throttle valve 2 to a predetermined position. Thus, even when the ECU 15 detects abnormality to turn the motor driving circuit 35 off, such a fail safe operation is realized that the engine does not stop nor rotate at a high speed but can operate sufficient to run a vehicle to a nearest automobile repair shop etc.

The ECU 15 calculates at a constant time period an air flow rate (hereinafter referred to a target air flow rate) to be supplied to the engine based on the position of the acceleration pedal measured by the acceleration pedal position sensor 14 and the rotation speed of the engine. Actual values of the air flow rate at respective time points are measured by the air flow sensor 1 attached at the upper stream side of the throttle valve 2. A current flowing into the motor 33 is measured by the current sensor 37 provided within the driving means 3. These measured values are digitized at a constant time period by the ECU 15. The ECU 15 calculates a duty ratio for equalizing an actual air flow rate with the target air flow rate based on these digital values and outputs the calculated duty ratio as the PWM signal. The PWM signal outputted from the ECU 15 is amplified by the motor driving circuit 35 and then applied to and drives the DC motor 33.

Explanation will be made with reference FIG. 4 as to another system configuration of the throttle valve controlling device according to the embodiment.

Figure 4:
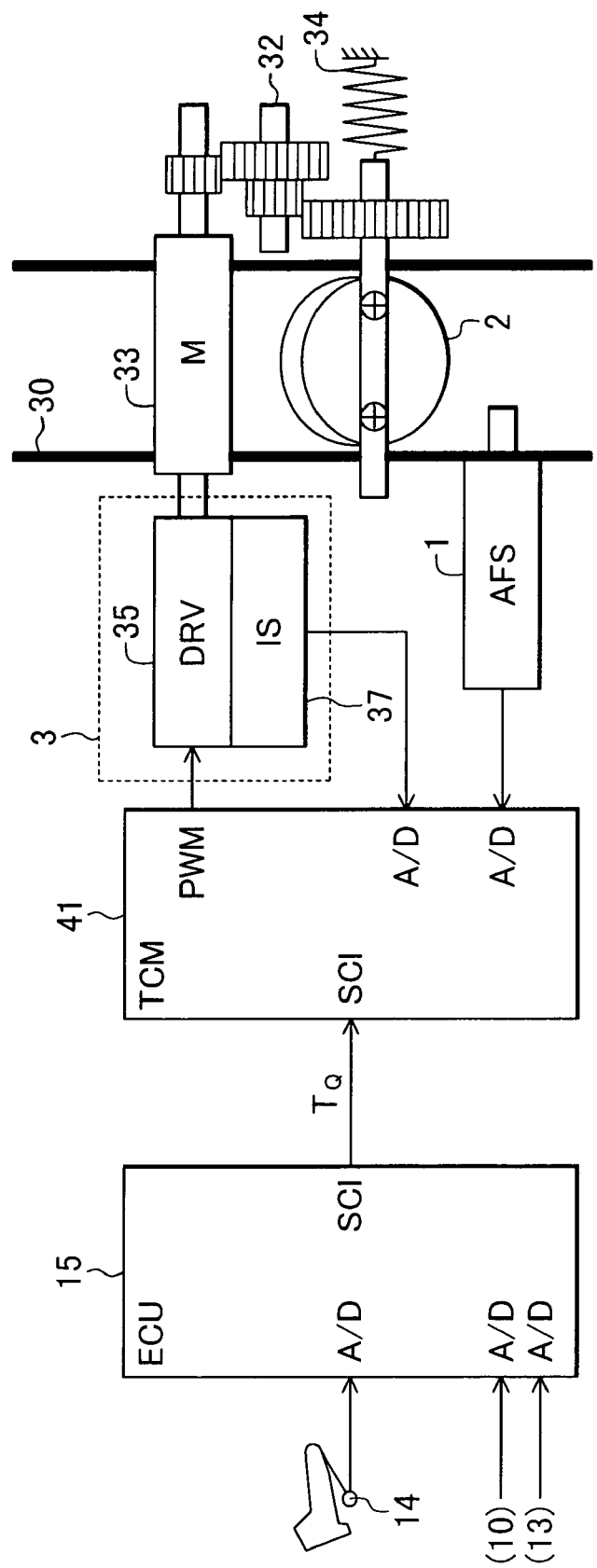
FIG. 4 is a diagram showing another system configuration of the control device for a throttle valve according to the embodiment of the present invention.

FIG. 4 shows the another system configuration of the throttle valve controlling device according to the embodiment of the present invention. In the figure, portions identical to those of FIG. 1 are referred to by the common symbols.

In this example, unlike the configuration shown in FIG. 3, a throttle control device (TCU) 41 for mainly driving the throttle valve is added in addition to the ECU 15 for controlling the fuel, the ignition or the like.

The ECU 15 calculates the target air flow rate TQ based on the position of the acceleration pedal measured by the acceleration pedal position sensor 14 and the rotation speed of the engine etc. and supplies the calculated target air flow rate to the TCU 41. The TCU 41 receives the target air flow rate from the ECU 15 through serial communication. The actual air flow rate measured by the air flow sensor 1 and the current flowing into the motor 33 measured by the motor current sensor 37 are digitized at a constant time period by the TCU 41. The TCU 415 outputs, to the driving circuit 35, the PWM signal with a duty ratio for equalizing an actual air flow rate with the target air flow rate based on these digital values thereby to drive the motor 33.

Next, explanation will be made with reference FIG. 5 as to the control method by the throttle valve controlling device according to the embodiment.

FIG. 5 is diagrams for explaining the control method by the throttle valve controlling device according to the embodiment of the present invention. In the figures, FIG. 5(A) is a block diagram showing a transfer characteristics from a duty ratio of the PWM signal, which is an input (control input) to the electronic control throttle device, to an air flow rate which is a subject to be controlled (controlled output). FIG. 5(B) is a diagram for explaining the relation between the duty ratio and the motor current. FIG. 5(C) is a diagram for explaining the relation between the motor current and the position of the throttle valve in the stationary state. FIG. 5(D) is a diagram for explaining the relation between the position of the throttle valve and the intake air flow rate to the engine.

Figure 5A:
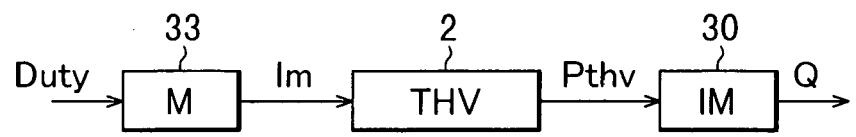
FIG. 5(A) is a block diagram showing a transfer characteristics from a duty ratio of a PWM signal, which is an input (control input) to the electronic control throttle device, to an air flow rate which is a subject to be controlled (controlled output).

As illustrated in the block diagram of FIG. 5(A) showing the transfer characteristics from a duty ratio of the PWM signal, which is the input (control input) to the electronic control throttle device, to an air flow rate which is the subject to be controlled (controlled output), the input to the DC motor (M) 33 is the duty ratio (Duty) of the drive signal outputted from the ECU 15 (or the TCU 41), and the output of the DC motor 33 is the motor current (I) flowing into the motor 33. Since the motor current (I) is proportional to a torque, which acts on the throttle valve (THV) 2 and moments of the gear and the motor or the like, whereby the throttle position (Pthv) of the throttle valve 2 changes. In accordance with the positional change of the throttle valve 2, an air flow rate Q within the intake pipe 30 responds thereto with a delay corresponding to a full amount.

These characteristics will be examined from the stationary characteristics in which various conditions are constant.

Figure 5B:
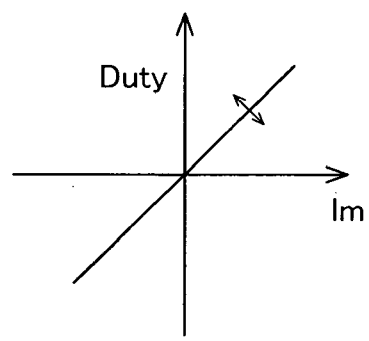
FIG. 5(B) is a diagram for explaining the relation between a duty ratio and a motor current.

As shown in FIG. 5(B), the relation between the duty ratio (Duty) and the motor current (I) is basically linear. However, the relationship between the duty ratio (Duty) and the motor current changes as follows depending on the motor rotation speed and the atmosphere temperature. For example, when the motor rotation speed increases, an apparent voltage applied to the motor reduces due to a counter electro-motive force and so the motor current also reduces. Further, a value of a contact resistance between the brush and the rotor of the motor is usually sufficiently small as compared with a value of a wire wound resistor. However, when the rotation speed of the motor is quite low and the duty ratio is small in such a case that the throttle valve is moved slightly, the valve starts to move or the valve is just before stopping at a target position, a value of the contact resistance becomes several times as large as that of the wire wound resistor and the degree of change of the contact resistance value becomes large. Further, a value of the wire wound resistor also changes in accordance with an atmosphere temperature. Thus, a current flowing into the motor changes largely depending on the condition of the motor even if the driving signal with the same duty ratio is inputted to the motor.

Figure 5C:
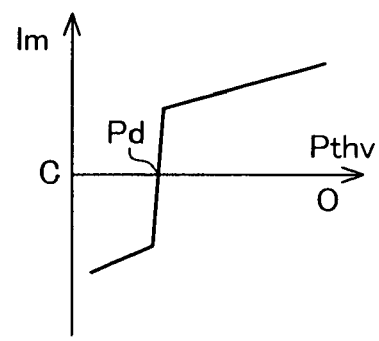
FIG. 5(C) is a diagram for explaining the relation between the motor current and a position of the throttle valve in a stationary state.

As shown in FIG. 5(C), a relation between the motor current and the position (between a fully closed state C and a full open state O) of the throttle valve in the stationary state is nonlinear. As a failsafe mechanism, the two springs 34 for generating torque in opposite directions are attached to the rotation shaft of the throttle valve 2. A preload is set to the springs 34 so that a torque of a predetermined value or more is applied to the valve in a direction of restoring the valve to the default position irrespective of the position of the valve. Thus, at time of failure, occurrence of runaway or engine stall can be prevented by turning off a power source thereby to restore the valve to the default position. With the provision of such the springs 34, in the normal position control, the valve may be influenced in a manner that the valve stops for a short time when the valve passes the default position Pd.

Figure 5D:
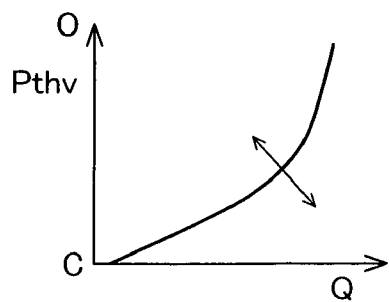
FIG. 5(D) is a diagram for explaining the relation between a position of the throttle valve and an intake air flow rate to the engine.

Further, as shown in FIG. 5(D), a relation between the position of the throttle valve and a intake air flow rate to the engine is nonlinear. Even in the case where the throttle valve 2 is in the fully closed state (C), when there is a pressure difference between the upstream side and the downstream side of the valve, air leaks through the valve and so the flow rate does not become 0. A sensitivity of the position of the throttle valve with respect to the air flow rate is large when the throttle valve is positioned in a region near the fully closed state, whilst the sensitivity becomes smaller as the opening degree of the throttle valve becomes larger. These characteristics are of course influenced by a pressure difference between the upstream side and the downstream side of the valve, that is, the rotation speed or the load of the engine.

As described above, the transfer characteristics from the duty ratio (Duty) of the PWM signal, which is the input (control input) to the electronic control throttle device shown in FIG. 5(A), to the air flow rate (Q) which is the subject to be controlled (controlled output) is large in the degree of nonlinearity and variance. Thus, even when the PWM input to the motor 33 is set to the same duty ratio, usually each of the throttle valve position and the air flow rate does not exhibit the same value depending on the operating state, the nonlinearity and the variance of the individual difference. As a result, it is difficult to obtain a duty ratio capable of realizing a required air flow rate by using a map or a model equation based on the required air flow rate thereby to accurately control the air flow rate through a feedback control.

In the conventional internal combustion engine control method, an ECU calculates an air flow rate (target air flow rate) at each timing in view of the operating state of the engine such as the position of the throttle valve or the engine rotation speed and then converts the calculated air flow rate into a throttle valve position (target throttle valve position) also based on the operating state of the engine. The position of the throttle valve is measured by the position sensor and feedback-controlled by the motor so that the valve position coincides with a target throttle valve position. Since a motor current corresponding to a torque generated by the motor at this time is not feedback-controlled, when the throttle valve is moved at a low speed, the entire resistance value of the motor becomes larger with fluctuation as described above, the controllability of the valve position degrades slightly. Further, since the air flow rate is feedforward-controlled in accordance with the throttle valve position, an actual air flow rate dose not necessarily coincide with the target air flow rate. Accordingly, a desired air fuel ratio is realized in a manner that the air flow rate is measured by the air flow sensor thereby to adjust an amount of fuel to be injected.

In contrast, according to the embodiment, the position sensor for the electronic control throttle device is abolished, and each of the motor current and the air flow rate is feedback-controlled instead of feedback-controlling the position of the throttle valve.

Explanation will be made with reference to FIG. 6 as to the control contents of the control device for a throttle valve according to the embodiment.

Figure 6:
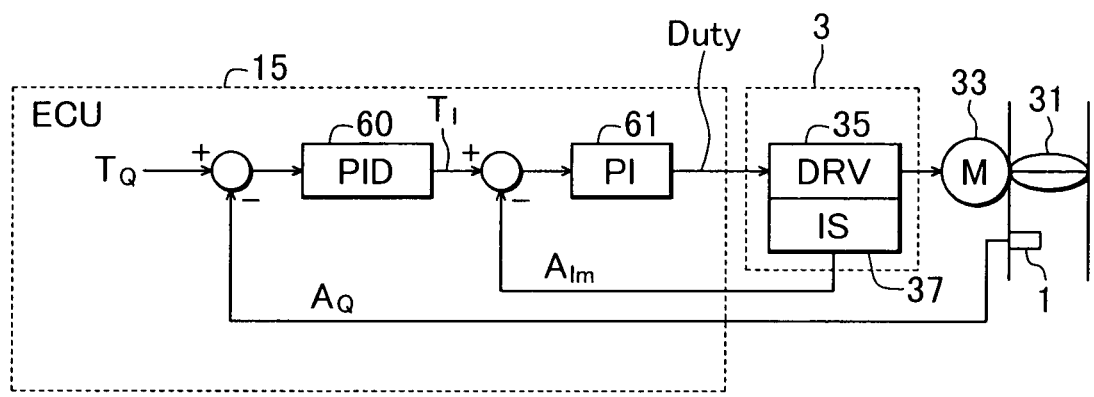
FIG. 6 is a block diagram showing control contents of the control device for a throttle valve according to the embodiment of the present invention.

FIG. 6 is a block diagram showing control contents of the control device for a throttle valve according to the embodiment. In the figure, portions identical to those of FIG. 3 are referred to by the common symbols.

An ECU 15 is provided with a PID control means 60 and a PI control means 61. A current flowing into the motor is measured by a motor current sensor 37 attached to a motor driving circuit 35 and the feedback control is performed by using the motor current thus measured.

As explained in FIG. 4, the electronic control device (ECU) 15 obtains a target intake air flow rate based on various detection values such as a intake air flow rate detected by the air flow sensor 1, a depression amount of the acceleration pedal detected by the acceleration pedal position sensor 14 and a rotation speed and a crank angle of the engine etc. of the engine detected by the crank angle sensor 13.

The PID control means performs a PID control based on a difference between a target flow rate (TQ) determined from the operating state by the ECU 15 and an actual air flow rate (AQ) measured by the air flow sensor 1 so that the actual air flow rate coincides with the target flow rate thereby to obtain a target value (TI) of a current flowing into the motor 33. The PI control 61 calculates a duty ratio (Duty) of the PWM signal to be inputted into the motor driving circuit 35 and outputs to the motor driving circuit 35 so that a difference between the target current value (TI) and a current value (AI) measured by the motor current sensor 37 becomes 0. The motor 33 is rotated in accordance with the duty ratio (Duty) to move the throttle valve 2 thereby to change the air flow rate (AQ).

Although it is possible to control the air flow rate only by feedback-controlling the air flow rate, as described above, there are various types of nonlinearlity in the characteristics from the duty ratio of the PWM signal which is the control input to the air flow rate which is the controlled output, and hence it is difficult to realize the responsibility of the air flow rate at a level satisfying the requirement of the engine. Thus, according to the embodiment, the motor current is feedback-controlled to obtain the stability and quick-response of the air flow rate.

Further, explanation will be made with reference to FIGS. 7 and 8 as to another control contents of the control device for a throttle valve according to the embodiment.

Figure 7:
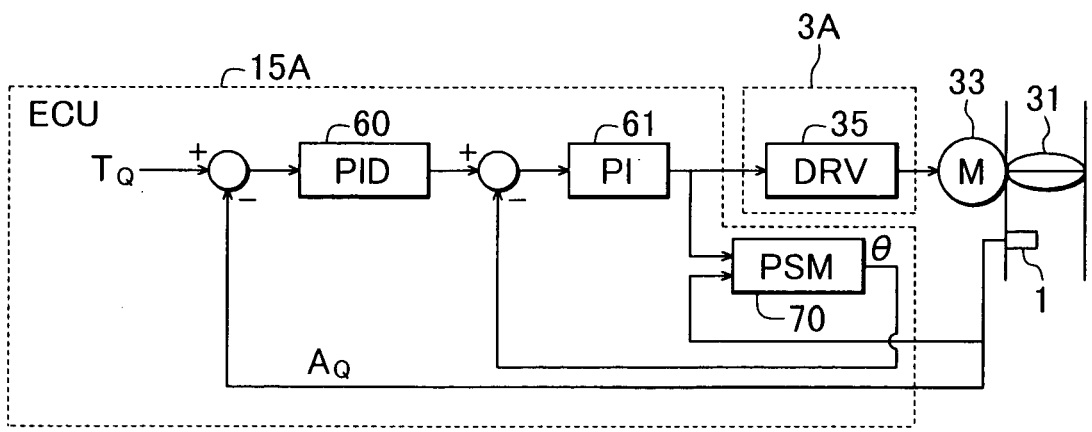
FIG. 7 is a block diagram showing another control contents of the control device for a throttle valve according to the embodiment of the present invention.

FIG. 7 is a block diagram showing the another control contents of the control device for a throttle valve according to the embodiment. In the figure, portions identical to those of FIGS. 3 and 6 are referred to by the common symbols.

In this example, as shown in FIG. 6, an estimating means (PSM) 70 for estimating a position ($\theta$) of the throttle valve is provided in place of providing the motor current sensor 37 for directly measuring a motor current (I). The estimating means (70) estimates the position of the throttle valve in the following manner.

Explanation will be made with reference to FIG. 8 as to an estimation method of the estimating means used in the another control contents of the control device for a throttle valve according to the embodiment of the present invention.

Figure 8:
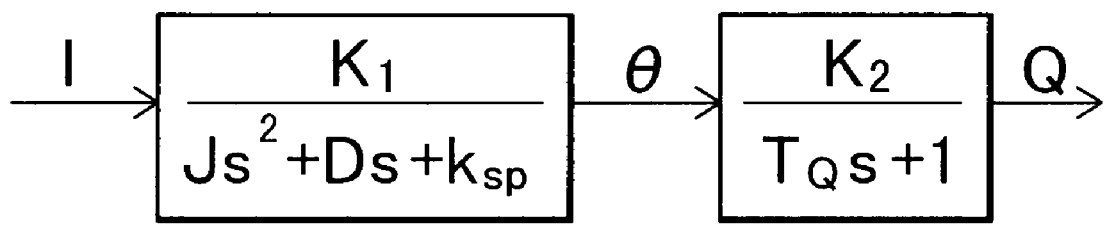
FIG. 8 is a block diagram of a linearizing model of an electronic control throttle device used in the another control contents of the control device for a throttle valve according to the embodiment of the present invention.

FIG. 8 is a block diagram of a linearizing model of the electronic control throttle device used in the another control contents of the control device for a throttle valve according to the embodiment of the present invention.

As shown in FIG. 8, the characteristics from the motor current (I) to the air flow rate (Q) is linearized in a manner that characteristics from the current (I) to the position ($\theta$) of the throttle valve is set as a second order lag system and characteristics from the position ($\theta$) of the throttle valve to the air flow rate (Q) is set as a first order lag system. In FIG. 8, J represents a moment, D a viscous resistance, ksp a spring constant, TQ a time constant of an air flow rate, K2 an air flow rate per one unit position of the throttle valve, I a motor current, q a position of the throttle valve and Q an air flow rate.

When the systems shown in FIG. 8 is collected as a linear system having three state amounts of a speed ω of the throttle valve, a position θ of the throttle valve and an air flow rate Q, the linear system will be explained as the following expression (1).

$$\begin{cases} \dfrac{d}{dt}\begin{pmatrix} \omega \\ \theta \\ Q \end{pmatrix} = \begin{pmatrix} -\dfrac{D}{J} & -\dfrac{k_{sp}}{J} & 0 \\ 1 & 0 & 0 \\ 0 & \dfrac{K_2}{T_Q} & -\dfrac{1}{T_Q} \end{pmatrix}\begin{pmatrix} \omega \\ \theta \\ Q \end{pmatrix} + \begin{pmatrix} \dfrac{K_1}{J} \\ 0 \\ 0 \end{pmatrix} I \\ Q = (0\ 0\ 1)\begin{pmatrix} \omega \\ \theta \\ Q \end{pmatrix} \end{cases} \quad (1)$$

Here, A and B are defined as the following expressions (2).

$$A = \begin{pmatrix} -\dfrac{D}{J} & -\dfrac{k_{sp}}{J} & 0 \\ 1 & 0 & 0 \\ 0 & \dfrac{K_2}{T_Q} & \dfrac{1}{T_Q} \end{pmatrix} B = \begin{pmatrix} \dfrac{K_1}{J} \\ 0 \\ 0 \end{pmatrix} C = (0\ 0\ 1) \quad (2)$$

A suitable transverse vector K is selected to constitute an observer of the linear theory as shown in the following expression (3).

$$\dfrac{d\hat{x}}{dt} = (A - CK)\hat{x} + BI, \hat{x} = (\hat{\omega}, \hat{\theta}, \hat{Q})^T \quad (3)$$

According to the expression (3), it is possible to estimate the speed ω and the position θ of the throttle valve each of which can not be directly measured by sensors. When the estimating means is actually mounted in a microcomputer and executes the calculation, the expression is dispersed and calculation is performed repeatedly.

Next, explanation will be made with reference to FIG. 9 as to the concrete configuration of the motor driving circuit 35 and the motor current sensor 37 used in the control device for a throttle valve according to the embodiment of the present invention.

Figure 9:
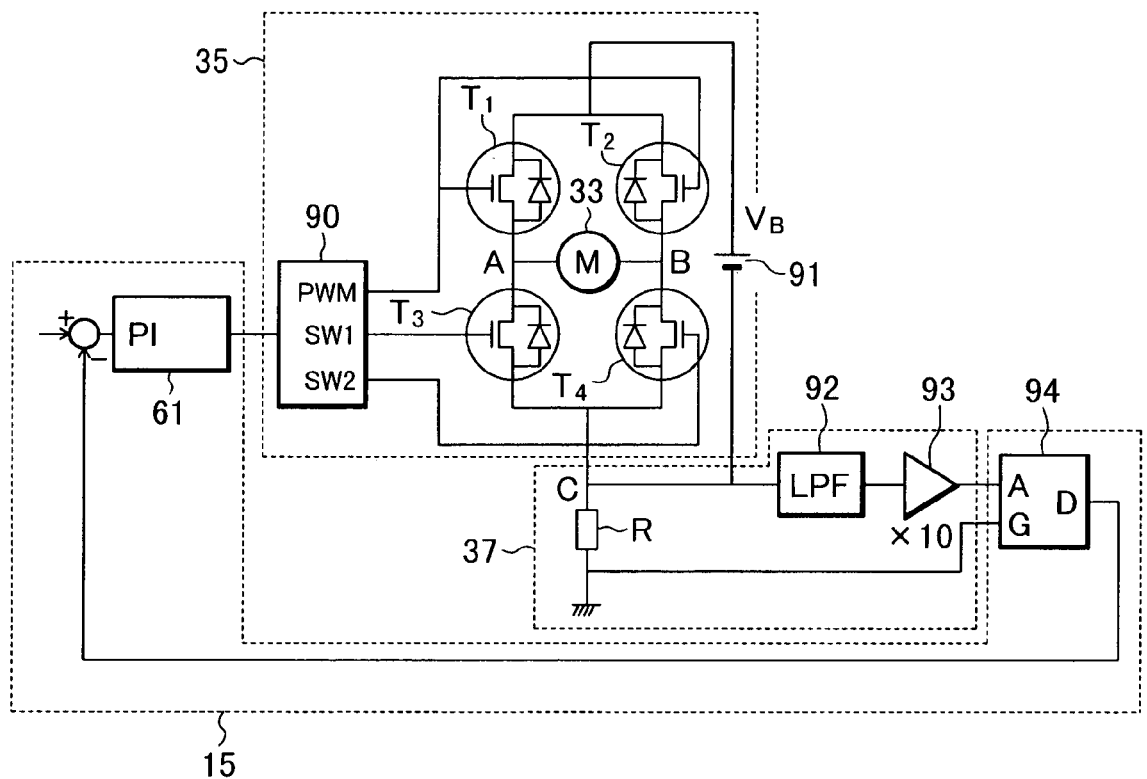
FIG. 9 is a circuit block diagram showing the concrete configuration of a driving circuit 35 and a motor current sensor 37 used in the control device for a throttle valve according to the embodiment of the present invention.

FIG. 9 is a block diagram showing the concrete configuration of the motor driving circuit 35 and the motor current sensor 37 used in the control device for a throttle valve according to the embodiment of the present invention. In the figure, portions identical to those of FIG. 6 are referred to by the common symbols.

In this example, an A/D converter of the ECU 15 detects a voltage difference generated at a detection resistor R provided at a motor driving circuit 35.

The motor driving circuit 35 is constituted by a PWM generation circuit 90, power transistors T1, T2, T3, T4 and a battery 91. The power transistors T1, T2, T3, T4 constitute an H bridge. A voltage to be applied to the motor obtained by the PI control means 61 of the ECU 15 is converted into a PWM signal and a signal in the rotational direction by the PWM generation circuit 90. The PWM signal is inputted into the power transistors T1 and T2 constituting the H bridge and the rotational direction signal is applied to the power transistors T3 and T4 constituting the H bridge. By using the motor driving circuit 35, the motor 33 can be driven in a PWM manner as well as the rotational direction control manner by the battery 91.

The motor current sensor 37 is constituted by a detection resistor R, a low pass filter (LPF) 92 and an amplifier 93. The detection resistor R is coupled between the motor driving circuit 35 of a DC motor 33 and the ground thereby to detect a current flowing into the motor 33 as a voltage across the detection resistor R. As the detection resistor R, a resistor which resistance value changing amount depending on the temperature is little is selected.

Since noises caused by the switching operation of the power transistors superimposes on the voltage across the both ends of the detection resistor R, the voltage is passed through the filter 92 to cut off the noises. Further, since the voltage across the both ends of the detection resistor R is small as compared with the voltage level (TTL) of the A/D converter contained within a usual microcomputer, the voltage is inputted into the A/D converter 94 of the ECU 15 through the amplifier 93. The ECU 15 can measure a current I flowing into the motor based on a measured voltage at a point C in FIG. 9 and a resistance value of the detection resistor R.

Some of the electronic control throttle devices have the circuits such as the circuit shown in FIG. 9 in order to perform self-diagnosis or self-diagnostic control. In this case, the circuit shown in FIG. 9 can be used for the self-diagnosis without changing the hardware thereof. Even in the case of adding a new detection portion, degree of the circuit change and the cost increase is a little.

Explanation will be made with reference to FIG. 10 as to the signal waveforms at the respective portions in FIG. 9.

Figure 10:
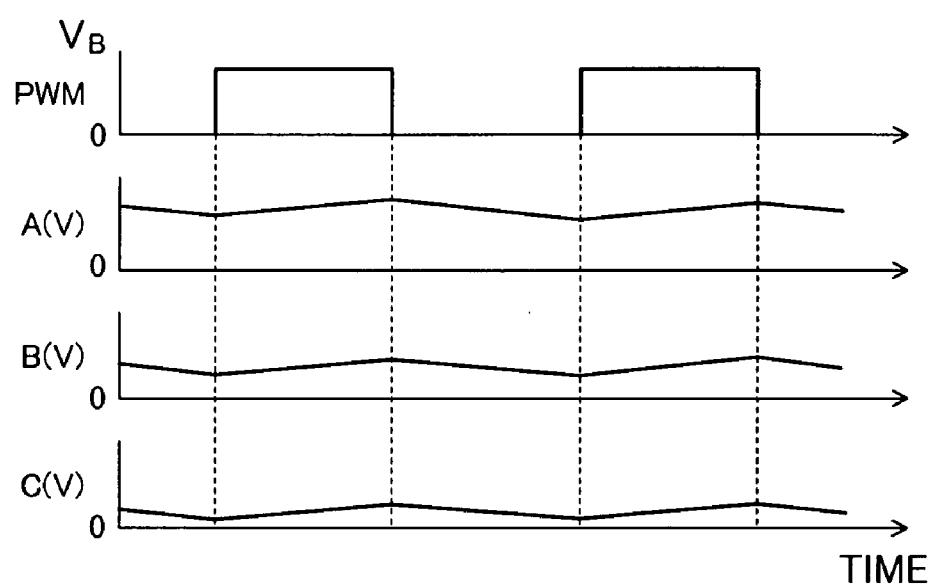
FIG. 10 is signal waveform diagrams at respective portions of the driving circuit and the motor current sensor used in the control device for a throttle valve according to the embodiment of the present invention.

FIG. 10 is signal waveform diagrams at the respective portions of the driving circuit and the motor current sensor used in the control device for a throttle valve according to the embodiment of the present invention.

In the motor driving circuit 35 shown in FIG. 9, the relation among the voltages at the respective points A, B, C and the PWM signal can be generally shown in FIG. 10. In the waveforms, it is supposed that the power transistors T3 and T4 are in an OFF state and ON state, respectively, and so the current flows from A toward C through B. Although, in fact the waveforms are influenced by the switching operations of the power transistors, FIG. 10 shows the ideal case not being influenced by the noises. The voltage at the point A is highest due to the wire wound resistor of the motor, an ON-state resistor of the power transistor T4 and the detection resistor. Since each of the motor and the power transistors changes in its resistance value depending on the temperature, it is most suitable to measure at the point C the voltage across the terminals of the detection resistor which resistance value changing amount depending on the temperature is a little. Then, the detected voltage is passed through the filter 92 of the motor current sensor 37 to remove noises and average the voltage of the driving circuit of the motor. Then, by setting the timing of the A/D conversion of the A/D converter 94 to a predetermined timing, a current value can be estimated from the sampled values sampled at the predetermined timing.

The motor current can be detected, instead of using the detection resistor in the aforesaid manner, by using a non-contact current sensor in a manner that a line thereof coupled to a power source of the motor is disposed so as to pass a ring-shaped detection portion.

INDUSTRIAL APPLICABILITY

As explained above, according to the embodiment, since the position sensor for a throttle valve can be dispensed, the control device for a throttle valve is provided which can reduce a cost of the sensor and which is excellent in durability and reliability and is reduced in its control delay.

What is claimed is:

1. A control device for a throttle valve comprising:
   an air flow sensor for detecting a flow rate of air flowing through an intake pipe of an internal combustion engine;
   a motor for driving the throttle valve disposed in the intake pipe:
   control means for controlling driving operation of the motor; and
   a current sensor for detecting a current flowing into the motor,
   wherein the control means feedback-controls both the output of the air flow sensor and an output of the current sensor,
   wherein the throttle valve is controlled so that a flow rate of air passing through the throttle valve coincides with an air flow rate required for the engine,
   wherein the control means feedback-controls an output of the air flow sensor so that a difference between the output of the air flow sensor and the air flow rate required for the engine decreases, and
   wherein the current sensor averages a voltage of a driving circuit for the motor and detects a current value from a sampled value of the averaged voltage which is sampled at a predetermined timing.

2. A control device for a throttle valve comprising:
   an air flow sensor for detecting a flow rate of air flowing through an intake pipe of an internal combustion engine;
   a motor for driving the throttle valve disposed in the intake pipe;
   control means for controlling driving operation of the motor; and
   current estimating means for estimating a current flowing into the motor,
   wherein the control means feedback-controls both the output of the air flow sensor and an estimated value of the current estimating means,
   wherein the throttle valve is controlled so that a flow rate of air passing through the throttle valve coincides with an air flow rate required for the engine, and
   wherein the control means feedback-controls an output of the air flow sensor so that a difference between the output of the air flow sensor and the air flow rate required for the engine decreases.

3. A control device for a throttle valve according to claim 2, wherein the current estimating means estimates a current flowing into the motor based on both a voltage applied to the motor and the output of the air flow sensor.

* * * * *